(12) United States Patent
Shiraishi et al.

(10) Patent No.: US 8,339,685 B2
(45) Date of Patent: Dec. 25, 2012

(54) IMAGE READING APPARATUS

(75) Inventors: Keiko Shiraishi, Ebina (JP); Kosuke Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 735 days.

(21) Appl. No.: 12/547,192

(22) Filed: Aug. 25, 2009

(65) Prior Publication Data
US 2010/0208310 A1    Aug. 19, 2010

(30) Foreign Application Priority Data
Feb. 17, 2009    (JP) ................. 2009-034397

(51) Int. Cl.
*H04N 1/04*    (2006.01)
*H04N 1/40*    (2006.01)

(52) U.S. Cl. ........ 358/497; 358/462; 358/474; 358/465; 358/505; 358/514

(58) Field of Classification Search .................. 358/497, 358/482, 483, 474, 462, 461, 505, 512–514; 250/208.1, 234–236, 216; 382/312, 318, 382/319
See application file for complete search history.

(56) References Cited

U.S. PATENT DOCUMENTS

| 6,522,431 | B1 * | 2/2003 | Pitts et al. | 358/474 |
| 2008/0024839 | A1 * | 1/2008 | Okada et al. | 358/497 |
| 2010/0134855 | A1 * | 6/2010 | Oumi | 358/475 |
| 2012/0105921 | A1 * | 5/2012 | Ikari | 358/474 |

FOREIGN PATENT DOCUMENTS

| JP | 2005-064913 A | 3/2005 |
| JP | 2006-270604 A | 10/2006 |

* cited by examiner

*Primary Examiner* — Cheukfan Lee
(74) *Attorney, Agent, or Firm* — Sughrue Mion, PLLC

(57) ABSTRACT

The image reading apparatus is provided with: a manuscript table on which a manuscript is placed; a reflection mirror that moves relative to the manuscript table, and that reflects light which is emitted to and then reflected by the manuscript placed on the manuscript table; an image data generating unit that includes plural light receiving pixels receiving the light reflected by the reflection mirror, and that generates image data on the basis of the light received by the plural light receiving pixels; and a positional information acquiring unit that acquires the image data generated by the image data generating unit with movement of the reflection mirror, and that acquires, on the basis of a density value of each pixel in the image data, information on a position of a pixel affected by an adhesion substance adhering to the reflection mirror.

4 Claims, 13 Drawing Sheets

US 8,339,685 B2

IMAGE READING APPARATUS

CROSS REFERENCE TO RELATED APPLICATIONS

This application is based on and claims priority under 35 USC §119 from Japanese Patent Application No. 2009-034397 filed Feb. 17, 2009.

BACKGROUND

1. Technical Field

The present invention relates to an image reading apparatus that reads an image of an original manuscript.

2. Related Art

An image reading apparatus is widely used in which an image on an original manuscript is read by receiving light reflected on a mirror while moving the mirror with respect to an original manuscript setting board.

SUMMARY

According to an aspect of the present invention, there is provided an image reading apparatus including: a manuscript table on which a manuscript is placed; a reflection mirror that moves relative to the manuscript table, and that reflects light which is emitted to and then reflected by the manuscript placed on the manuscript table; an image data generating unit that includes plural light receiving pixels receiving the light reflected by the reflection mirror, and that generates image data on the basis of the light received by the plural light receiving pixels; and a positional information acquiring unit that acquires the image data generated by the image data generating unit with movement of the reflection mirror, and that acquires, on the basis of a density value of each pixel in the image data, information on a position of a pixel affected by an adhesion substance adhering to the reflection mirror.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
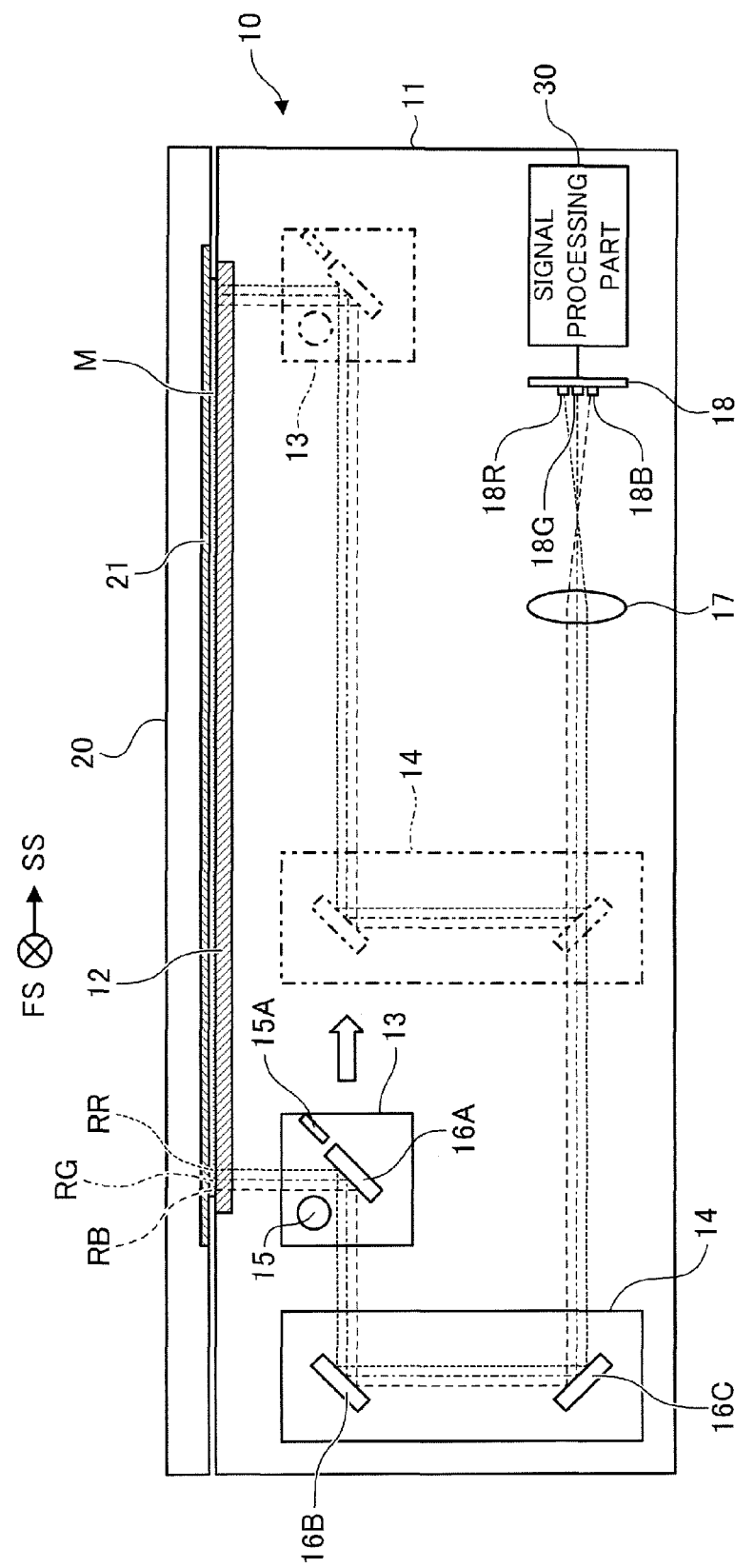
FIG. 1 is a diagram showing a schematic configuration of an image reading apparatus to which the exemplary embodiment is applied.

FIG. 1 is a diagram showing a schematic configuration of an image reading apparatus to which the exemplary embodiment is applied.

This image reading apparatus includes a reading part 10 that reads an image of a fixed manuscript M, and a platen cover 20 that is attached to the reading part 10 so as to be freely opened and closed and is used to fix the manuscript M to the reading part 10.

The reading part 10 includes an apparatus frame 11 that constitutes a housing, and a platen glass 12 that is one example of a manuscript table which is attached to an upper surface of the apparatus frame 11 and on which the manuscript M is placed in a stationary state. The reading part 10 includes: a full rate carriage 13 that moves almost all over the platen glass 12, and reads the image of the manuscript M through the platen glass 12; and a half rate carriage 14 that moves at half speed of the full rate carriage 13, and provides an image formation part with the light acquired from the full rate carriage 13.

The full rate carriage 13 includes an illumination lamp 15 that irradiates the manuscript M with white light, a reflector 15A that reflects the irradiation light from the illumination lamp 15 toward the platen glass 12, and a first mirror 16A that receives the reflection light reflected from the manuscript M. The half rate carriage 14 includes a second mirror 16B and a third mirror 16C that provide the image formation part with the light reflected from the first mirror 16A.

Moreover, the reading part 10 further includes: an image formation lens 17 that forms an image by optically minifying an image of the light (optical image) reflected from the third mirror 16C; a light receiving unit 18 that receives the light outputted from the image formation lens 17, performs photoelectric conversion on the received light, and then outputs received-light data thus generated; and a signal processing part 30 that processes the received-light data inputted from the light receiving unit 18.

Note that, in the following descriptions, a second scan direction SS denotes a direction in which the full rate carriage 13 and the half rate carriage 14 move, and a first scan direction FS denotes a direction orthogonal to the second scan direction.

The platen cover 20 is disposed to face the reading part 10, and includes a backing member 21 that presses the manuscript M against the platen glass 12 when the platen cover 20 is closed on the reading part 10. Here, an exposed surface of the backing member 21 is entirely white.

Figure 2:
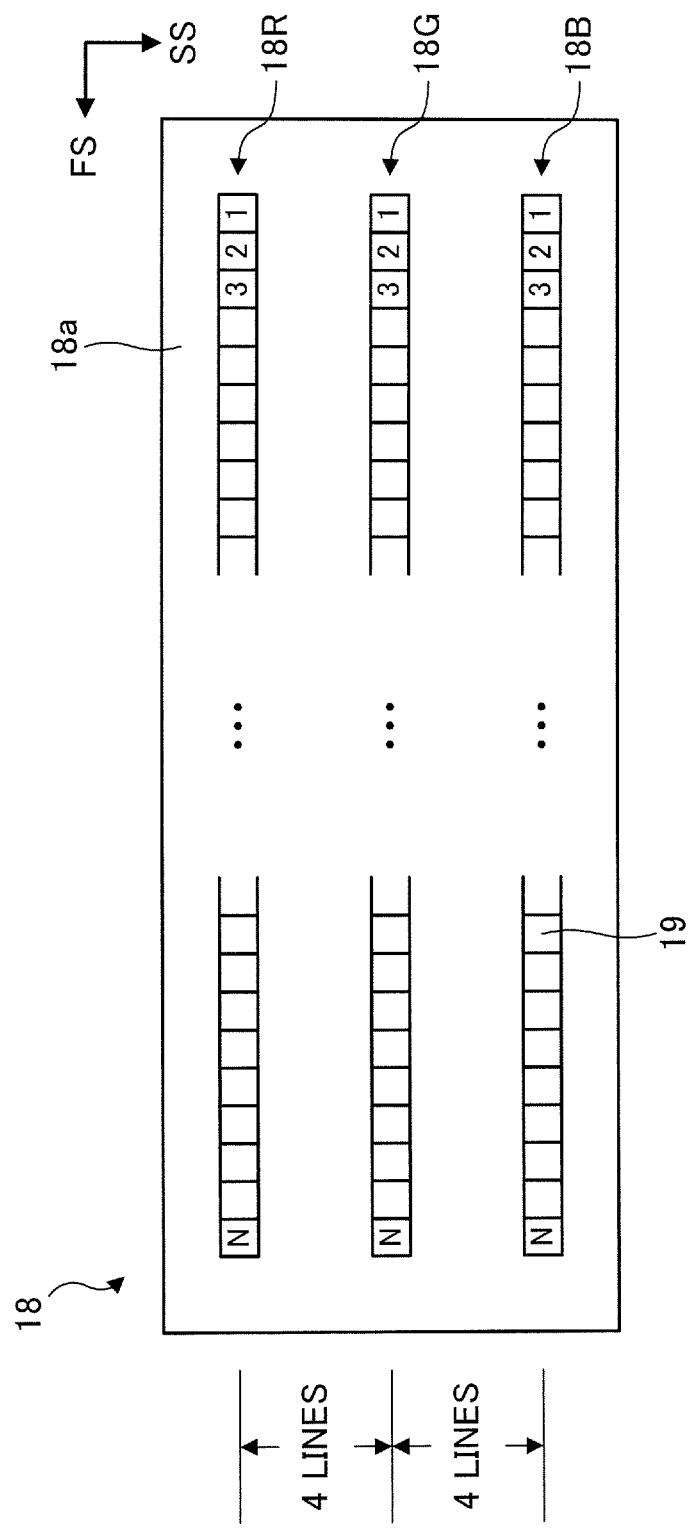
FIG. 2 is a diagram showing a schematic configuration of the light receiving unit provided in the reading part.

FIG. 2 is a diagram showing a schematic configuration of the light receiving unit 18 provided in the reading part 10. The light receiving unit 18 is one example of an image data generating unit and includes a rectangular substrate 18a, as well as a red charge coupled device (CCD) line sensor 18R, a green CCD line sensor 18G and a blue CCD line sensor 18B which are provided on the substrate 18a. Each of the red CCD line sensor 18R, the green CCD line sensor 18G and the blue CCD line sensor 18B is arranged to extend in the first scan direction FS. The three CCD line sensors are arranged side by side in the second scan direction SS. Each of the red CCD line sensor 18R, the green CCD line sensor 18G and the blue CCD line sensor 18B is configured in a way that N light receiving elements (light receiving pixels) 19 formed of photodiodes and the like are arranged in a straight line in the first scan direction FS. An interval between the red CCD line sensor 18R and the green CCD line sensor 18G, and an interval between the green CCD line sensor 18G and the blue CCD line sensor 18B are equivalent to four first scan lines in the second scan direction SS (hereinafter, simply called a four line distance).

The blue CCD line sensor 18B outputs image signals B representing blue components of the N pixels arranged in the straight line in the first scan direction FS at a blue reading position RB that is located on an uppermost stream side in the second scan direction SS as shown in FIG. 1. The green CCD line sensor 18G outputs image signals G representing green components of the N pixels arranged in the straight line in the first scan direction FS at a green reading position RG that is located downstream of the blue reading position RB by the four line distance in the second scan direction SS. Then, the red CCD line sensor 18R outputs image signals R representing red components of the N pixels arranged in the straight line in the first scan direction FS at a red reading position RR that is located downstream of the green reading position RG by the four line distance, that is, located on a downmost stream side, in the second scan direction SS. As will be described later, these blue reading position RB, green reading position RG and red reading position RR move with the movement of the full rate carriage 13 in the second scan direction SS. However, a relative position relationship among these blue reading position RB, green reading position RG and red reading position RR is unchanged.

Figure 3:
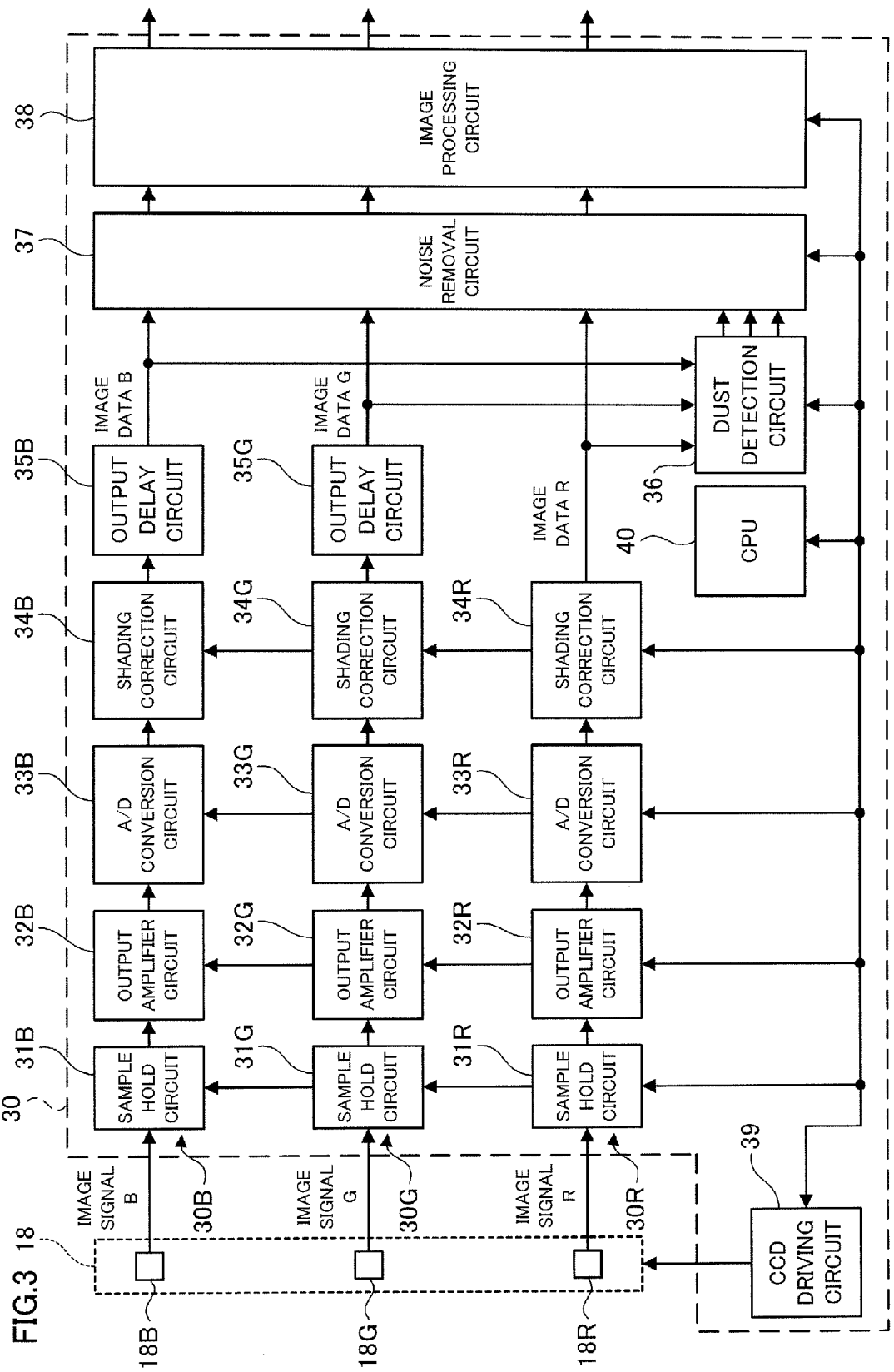
FIG. 3 is a block diagram showing a configuration of the signal processing part.

FIG. 3 is a block diagram showing a configuration of the signal processing part 30 shown in FIG. 1.

In the present exemplary embodiment, the light receiving unit 18 is driven in response to driving signals from a CCD driving circuit 39, and thereby outputs analog image signals R, G and B from the red CCD line sensor 18R, the green CCD line sensor 18G and the blue CCD line sensor 18B, respectively.

The signal processing part 30 includes: a red signal processing system 30R including a sample hold circuit 31R, an output amplifier circuit 32R, an A/D conversion circuit 33R and a shading correction circuit 34R: a green signal processing system 30G including a sample hold circuit 31G, an output amplifier circuit 32G, an A/D conversion circuit 33G and a shading correction circuit 34G; and a blue signal processing system 30B including a sample hold circuit 31B, an output amplifier circuit 32B, an A/D conversion circuit 33B and a shading correction circuit 34B. These red signal processing system 30R, green signal processing system 30G and blue signal processing system 30B are signal processing systems for the analog image signals R, G and B obtained at the red reading position RR, the green reading position RG and the blue reading position RB, respectively.

The analog image signals R, G and B obtained from the light receiving unit 18 are sampled by the respective sample hold circuits 31R, 31G and 31B, then are amplified to appropriate levels by the respective output amplifier circuits 32R, 32G and 32B, and thereafter are converted into digital image data R, G and B by the A/D conversion circuits 33R, 33G and 33B, respectively. The digital image data R, G and B thus obtained are corrected by the shading correction circuits 34R, 34G and 34B, respectively, according to variations in sensitivity of the red, green and blue CCD line sensors 18R, 18G and 18B, and according to distribution characteristics of light quantity of optical systems of the red, green and blue CCD line sensors 18R, 18G and 18B.

The signal processing part 30 further includes output delay circuits 35G and 35B. The output delay circuits 35G and 35B delay outputs of the image data G and B from the respective shading correction circuits 34G and 34B, by delay times equivalent to the four line distance and the eight line distance, respectively, and output the respective image data G and B in phase with the image data R.

In addition, the signal processing part 30 includes a dust detection circuit 36, a noise removal circuit 37 and an image processing circuit 38.

The dust detection circuit 36 has functions of: detecting a pixel affected by dust existing in the optical path, from the image data R, G and B outputted respectively from the shading correction circuit 34R and the output delay circuit 35G and 35B; and generating and holding dust detection data indicating the position and the like of the dust. The noise removal circuit 37 has functions of: removing a line noise caused by the dust, from the image data R, G and B on the basis of the dust detection data outputted from the dust detection circuit 36; and outputting the resultant image data R, G and B to the image processing circuit 38. Moreover, the image processing circuit 38 has functions of performing various types of image processing on the image data R, G and B outputted from the noise removal circuit 37. The types of image processing mentioned here are color space conversion, scaling processing, ground color removal processing, and binarization processing, for example. The dust detection circuit 36 and the noise removal circuit 37 will be described in more detail later.

The signal processing part 30 further includes a central processing unit (CPU) 40.

The CPU 40 controls all the parts of the image reading apparatus shown in FIG. 1. To be more specific, the CPU 40 sets a cycle in which the CCD driving circuit 39 drives the light receiving unit 18. Moreover, the CPU 40 controls the gains of the output amplifier circuits 32R, 32G and 32B, and also controls the shading correction circuit 34R, 34G and 34B, the dust detection circuit 36, the noise removal circuit 37, the image processing circuit 38 and the like. Additionally, the CPU 40 controls operations of the full rate carriage 13, the half rate carriage 14 and the like.

Figure 4:
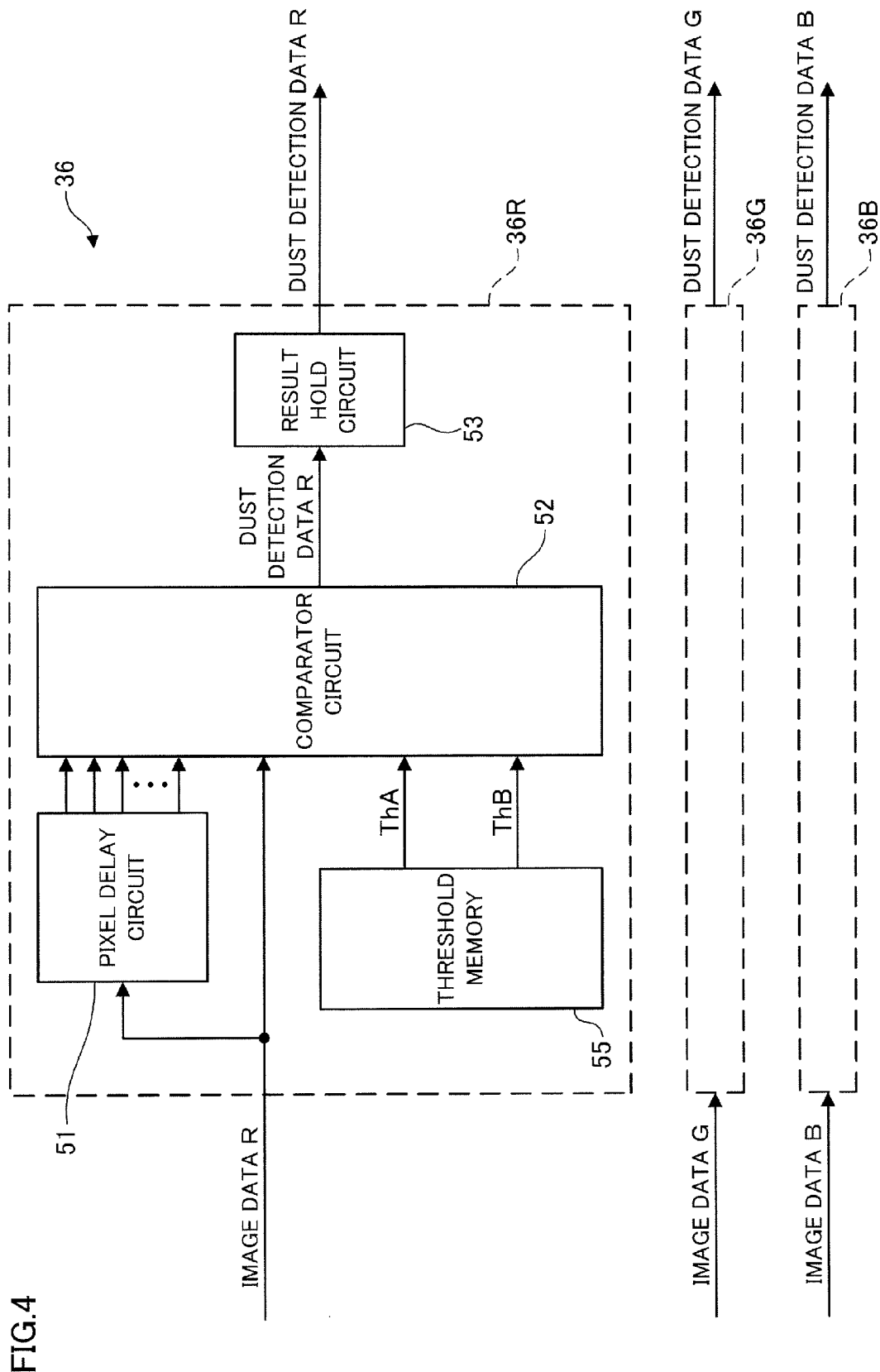
FIG. 4 is a block diagram showing a configuration of the dust detection circuit.

FIG. 4 is a block diagram showing a configuration of the foregoing dust detection circuit 36.

The dust detection circuit 36 includes a red dust detection circuit 36R, a green dust detection circuit 36G, and a blue dust detection circuit 36B for the image data R, G and B, respectively. Each of the red dust detection circuit 36R, the green dust detection circuit 36G, and the blue dust detection circuit 36B includes a pixel delay circuit 51, a comparator circuit 52, a result hold circuit 53, and a threshold memory 55.

Among these, the pixel delay circuit 51, the comparator circuit 52, and the result hold circuit 53 have functions of: detecting dust on a first scanning line at a read position on the basis of the corresponding one of the inputted image data R, G and B; generating dust detection data; and holding the generated dust detection data. Here, the red dust detection circuit 36R, the green dust detection circuit 36G, and the blue dust detection circuit 36B have the same configuration, and thus FIG. 4 only shows a detailed configuration of the red dust detection circuit 36R.

The pixel delay circuit 51 delays the inputted pixel data by 18 pixels, and outputs the pixel data of totally 19 pixels to the comparator circuit 52. The comparator circuit 52 performs dust detection by using the pixel data outputted from the pixel delay circuit 51 together with a first threshold ThA and a second threshold ThB read from the threshold memory 55, and outputs dust detection data R including a bit of "1" for each pixel determined as having dust therein and a bit of "0" for each pixel determined as having no dust. Then, the dust detection data R is held by the result hold circuit 53.

Figure 5:
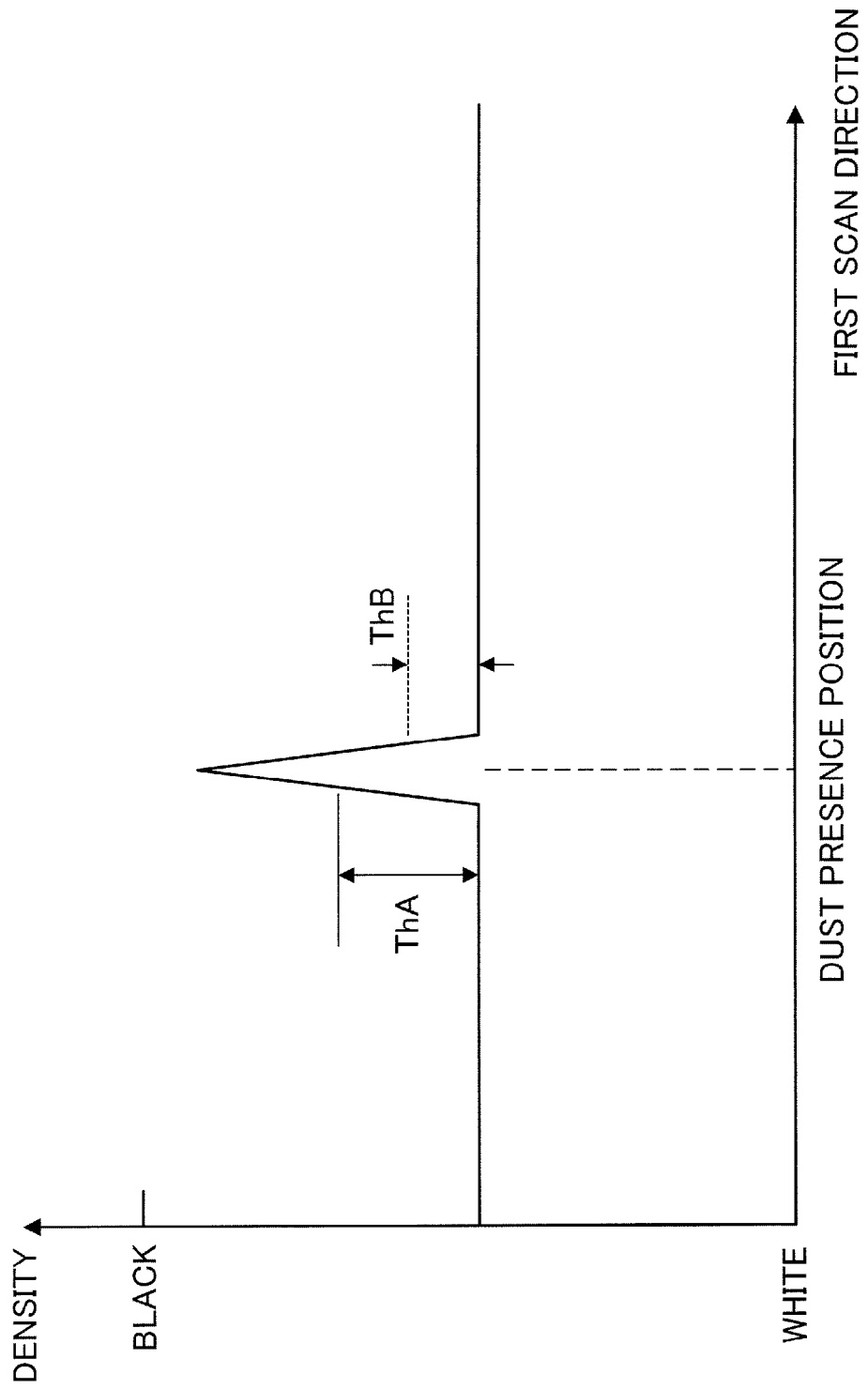
FIG. 5 is a diagram for explaining processing in a comparator circuit.
Figure 6:
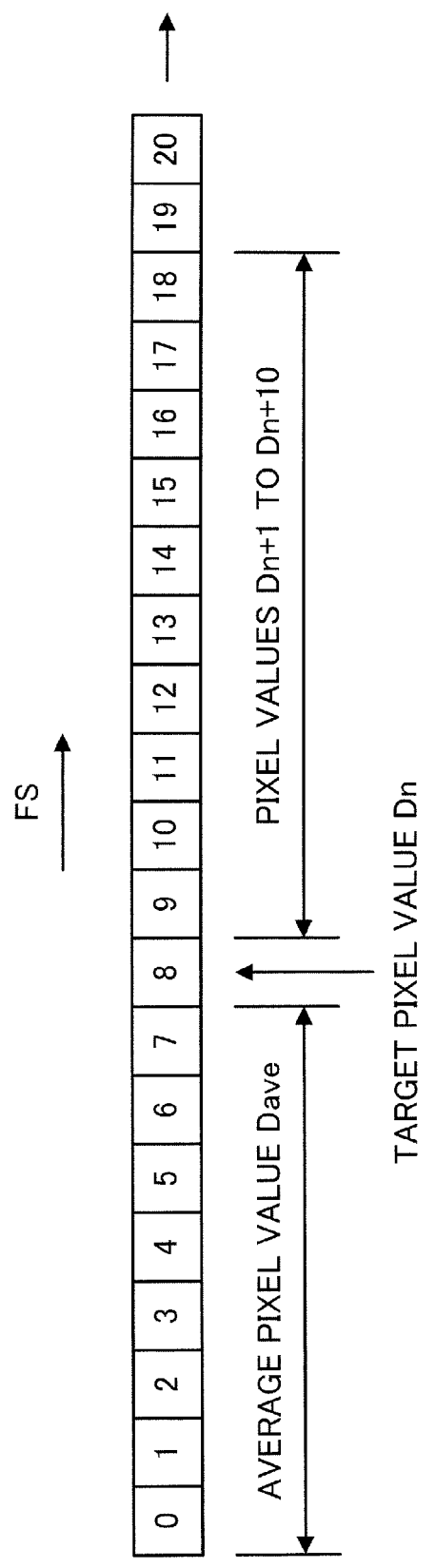
FIG. 6 is a diagram for explaining a dust detection algorithm.

In the present exemplary embodiment, the comparator circuit 52 determines that there is a piece of dust (dust presence position) in pixels starting from a pixel in which the density changes by a degree of a first threshold ThA or more, and ending at a pixel in which the density is returned to a degree of a second threshold ThB or less after the change, as shown in FIG. 5 (a diagram for explaining processing in the comparator circuit). More specific description is provided here on the assumption that a target pixel is the 9th pixel out of the 19 pixels (see FIG. 6 (a diagram for explaining a dust detection algorithm)) outputted from the pixel delay circuit 51, for example. If the pixel value $D_n$ (target pixel value) of the target pixel, and the average value $D_{ave}$ (average pixel value) of the pixel values of eight pixels preceding the target pixel in the first scan direction FS satisfy a relationship expressed by (Formula 1), the comparator circuit 52 determines that there is a piece of black dust in a section from the target pixel to one pixel of the 10 pixels subsequent to the target pixel, the one pixel having a pixel value (any of $D_{n/1}$ to $D_{n/10}$) satisfying a relationship below expressed by (Formula 2). In the above determination, the reason for comparing the pixel value $D_n$ of the target pixel, with the average value $D_{ave}$ of the pixel values of the eight pixels preceding the target pixel is to avoid an influence by a subtle variation among the pixel values of the preceding pixels.

The present exemplary embodiment has been described for the case where the average value $D_{ave}$ is calculated from the pixel values of the eight pixels preceding the target pixel. However, the average value $D_{ave}$ may be calculated from the pixels values of nine or more pixels, or inversely, from the pixel values of seven or less pixels. Moreover, the present exemplary embodiment has also been described for the case where a determination is made as to whether any one of the 10 pixels subsequent to the target pixel has a pixel value satisfying the relationship expressed by (Formula 2). In this way, a piece of dust having a width of 11 pixels, at maximum, is detectable. Nevertheless, the number of pixels each to be determined as to whether its pixel value satisfies the relationship expressed by (Formula 2) is not limited to 10, and may be determined according to a maximum width of a piece of dust to be detectable.

$$D_{ave}+ThA<D_n \quad \text{(Formula 1)}$$

$$D_{n+1} \text{ to } D_{n+10}<D_{ave}+ThB \quad \text{(Formula 2)}$$

In contrast, if the pixel value $D_n$ of the target pixel and the aforementioned average value $D_{ave}$ satisfy a relationship below expressed by (Formula 3), the comparator circuit 52 determines that there is a piece of white dust in a section from the target pixel to one pixel of the 10 pixels subsequent to the target pixel, the one pixel having a pixel value (any of $D_{n+1}$ to $D_{n+10}$) satisfying a relationship below expressed by (Formula 4).

$$D_{ave}-ThA>D_n \quad \text{(Formula 3)}$$

$$D_{n+1} \text{ to } D_{n+10}>D_{ave}-ThB \quad \text{(Formula 4)}$$

Then, the comparator circuit 52 outputs, as the dust detection data, a logical add of a determination result based on (Formula 1) and (Formula 2) and a determination result based on (Formula 3) and (Formula 4). The result hold circuit 53 holds the dust detection data.

Figure 7:
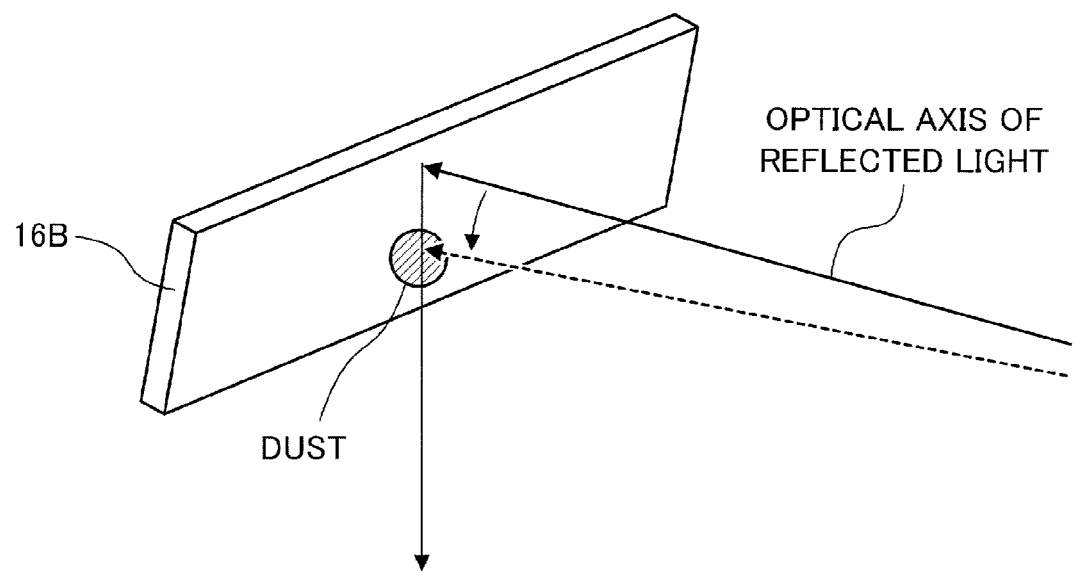
FIG. 7 is a diagram for explaining a change in an optical path in the image reading apparatus.
Figure 8:
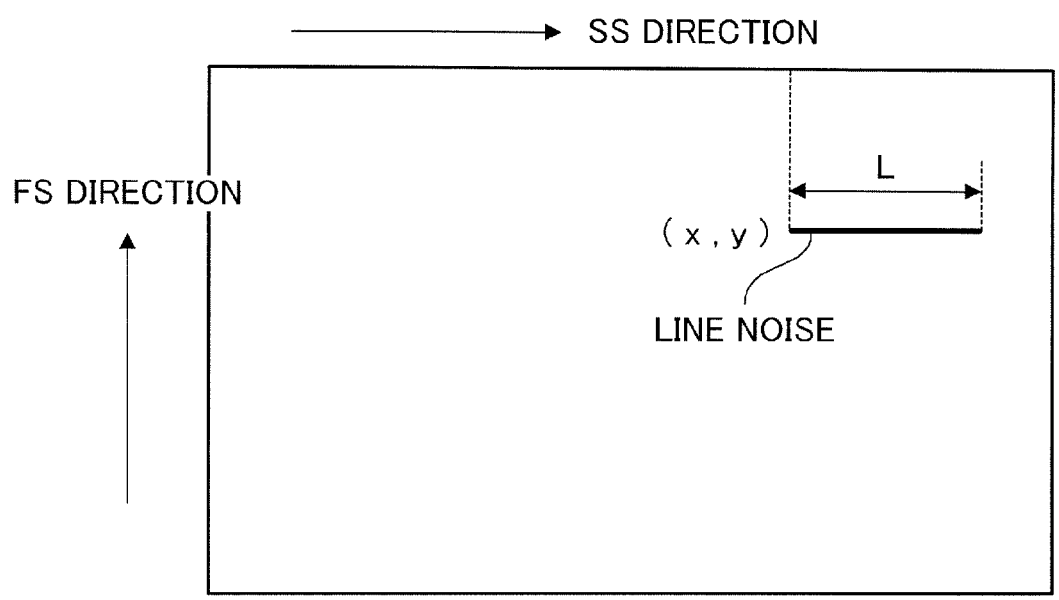
FIG. 8 is a diagram for explaining a read image.

FIG. 7 is a diagram for explaining a change in an optical path in the image reading apparatus. FIG. 8 is a diagram for explaining a read image.

In the image reading apparatus of the present exemplary embodiment, the full rate carriage 13 and the half rate carriage 14 move in the second scan direction, as described above. During the movement of these carriages 13 and 14, the light reflected by the manuscript M is reflected by the first mirror 16A, the second mirror 16B and the like, and eventually reaches the light receiving unit 18. However, with the movement of the full rate carriage 13 and the like, the optical axis of the reflected light may be tilted (see FIG. 7) due to an error in the installation of the first mirror 16A and the like. To put it differently, the optical path of the reflected light may shift in some cases. When there is a piece of dust in the optical path thus shifted (FIG. 7 illustrates a case where a piece of dust adheres to the second mirror 16B), a line noise occurs in a read image as shown in FIG. 8. For this reason, in the present exemplary embodiment, this noise is removed by using the foregoing configuration.

Hereinafter, processing for noise removal will be described specifically. In the present exemplary embodiment, an image reading is first carried out with no manuscript M placed on the platen glass 12. In other words, an image of the backing member 21 is read.

Figure 9:
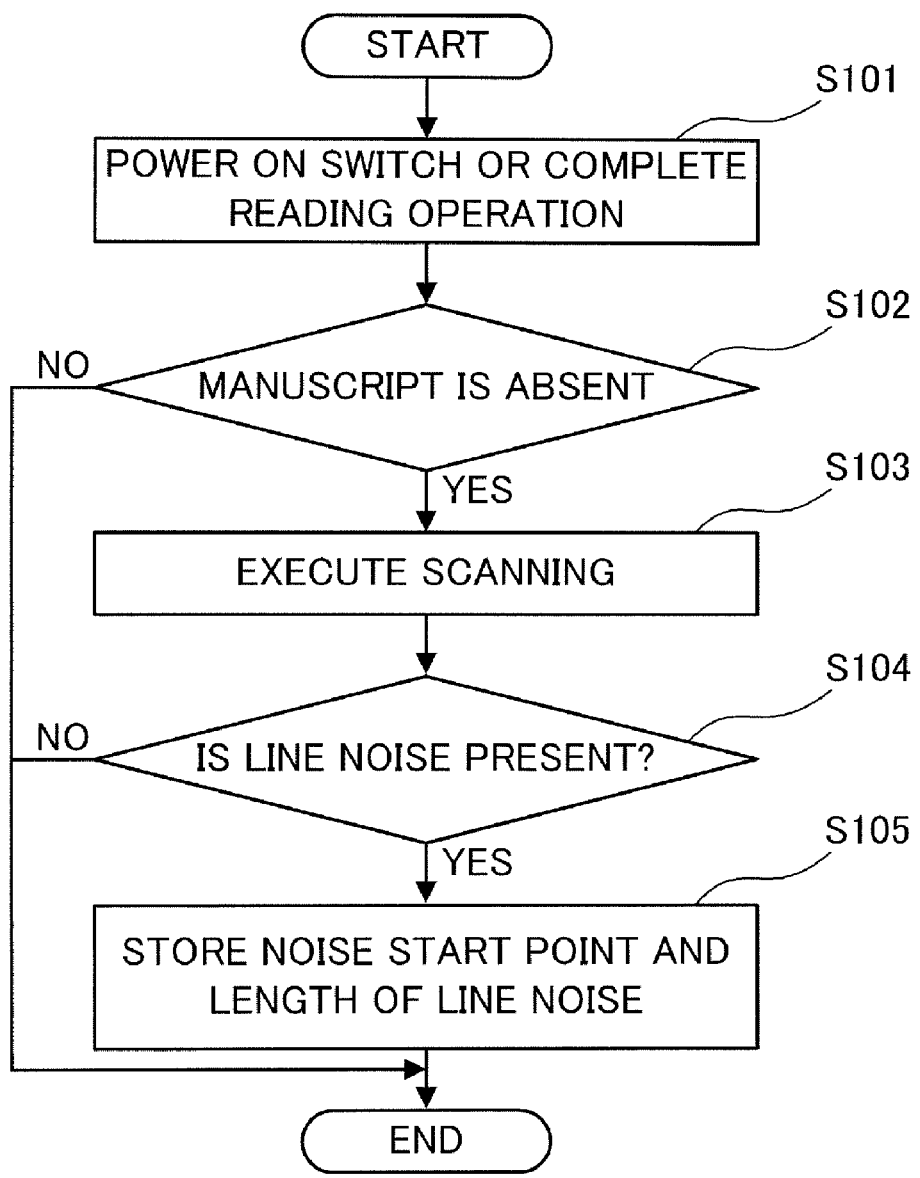
FIG. 9 is a flowchart showing processing performed by the image reading apparatus.

FIG. 9 is a flowchart showing processing performed by the image reading apparatus.

Firstly, when a power switch, which is not shown in the figure, is turned (powered) on, or when an ongoing operation of reading a manuscript M is completed (step 101), the CPU 40 (see FIG. 3) determines whether or not a manuscript M is absent on the platen glass 12 (step 102). If the CPU 40 determines that a manuscript M is present, the processing is terminated. Here, the determination as to whether or not a manuscript M is absent may be made, for example, on the basis of an output from a sensor (not shown in the figure) provided below the platen glass 12, or instead, on the basis of information inputted by a user through a user interface (UI) not shown in the figure.

On the other hand, if the CPU 40 determines that a manuscript M is absent, the CPU 40 drives motors, which are not shown in the figure, to move the full rate carriage 13 and the half rate carriage 14, and thereby scanning is executed (step 103). Through the scanning, the image data of RGB colors is sequentially outputted from the light receiving unit 18, and is inputted to the respective pixel delay circuits 51 and the respective comparator circuits 52, which are provided in the red dust detection circuit 36R, the green dust detection circuit 36G and the blue dust detection circuit 36B. Then, the dust detection data outputted from each of the comparator circuits 52 is held by corresponding one of the result hold circuits 53, respectively.

Next, the CPU 40 determines whether or not a line noise is present, on the basis of the dust detection data held by the result hold circuit 53 (step 104). Here, the CPU 40 determines that a line noise is present if pixels determined as having dust successively exist in a predetermined number of lines in the second scan direction. To be more precise, if pixels determined as having dust successively exist in the predetermined number of lines in the second scan direction, the CPU 40, which functions as a recognition unit, recognizes that dust adhering to the second mirror 16B or the like is affecting image data. Then, if the CPU 40 determines in step 104 that a line noise is present, the CPU 40, which functions as a positional information acquiring unit, acquires a noise start point (x, y) (see FIG. 8) and the length (the number of pixels) L of this line noise, and stores the noise start point and the length L in the result hold circuit 53 of the dust detection circuit 36 (step 105).

On the other hand, if it is determined in step 104 that no line noise is present, the processing in step 105 is skipped. As described above, in step 104, it is determined that a line noise is present if pixels determined as having dust successively exist in the predetermined number of lines in the second scan direction. In other words, a predetermined number of pixels determined as having dust are successively located, it is determined that a line noise is present. In contrast, if pixels determined as having dust do not successively exist in the predetermined number of lines in the second scan direction, it is determined that no line noise is present. The processing described above is intended to prevent a noise due to another factor such as a stain on the backing member 21 (see FIG. 1) from being stored in the result hold circuit 53.

Instead of the foregoing processing, in step 105, the position (a coordinate in the first scan direction, a coordinate in the second scan direction) of each of the pixels determined as having dust may be stored in the result hold circuit 53. Moreover, although the foregoing processing includes determining whether or not a manuscript M is absent on the platen glass 12, the processing in step 103 and the subsequent steps may be performed without determining whether or not a manuscript M is absent. In other words, when the power switch is turned on, or when an ongoing operation of reading a manuscript M is completed, the processing in step 103 and the subsequent steps may be performed without determining whether or not a manuscript M is absent. This is because no manuscript M is highly likely to exist on the platen glass 12 immediately after when the power switch is turned on or the operation of reading a manuscript M is completed.

Hereinafter, the noise removal processing will be described.

When an image of a manuscript M is read with dust adhering to the second mirror 16B, for example, the image data includes noise due to the line noise. To address this matter, processing shown in FIG. 10 is performed in image reading of a manuscript M.

Figure 10:
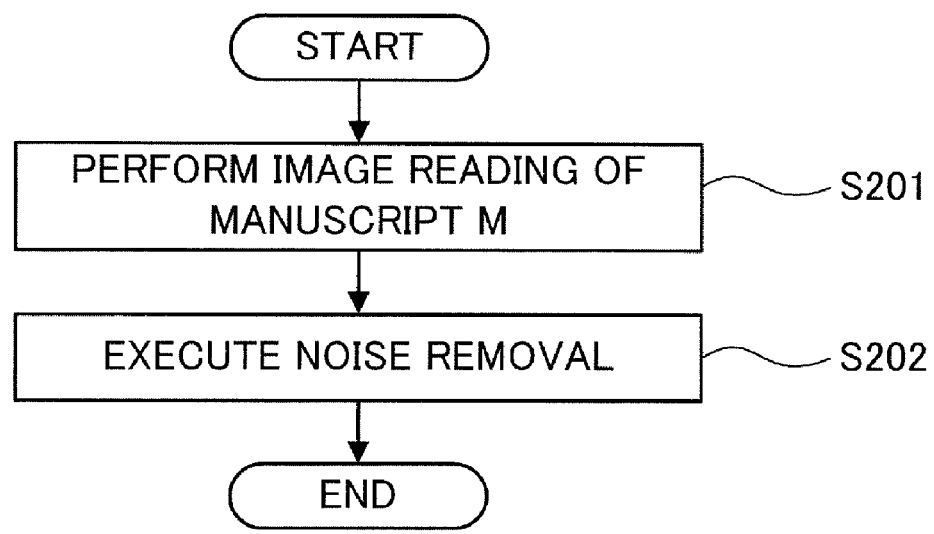
FIG. 10 is a flowchart showing the processing performed in the image reading of a manuscript.

FIG. 10 is a flowchart showing the processing performed in the image reading of a manuscript M.

Firstly, when a start button not shown in the figure is pressed down, the CPU 40 drives the motors, which are not shown in the figure, to move the full rate carriage 13 and the half rate carriage 14, and thereby the image reading of the manuscript M is performed (step 201).

As a result, analog image signals R, G and B are outputted from the light receiving unit 18, and are sampled by the sample hold circuits 31R, 31G and 31B, respectively. Then, the sampled analog image signals R, G and B are amplified to appropriate levels by the output amplifier circuits 32R, 32G and 32B, respectively, and then are converted into digital image data R, G and B by the A/D conversion circuits 33R, 33G and 33B, respectively. After that, the shading correction circuits 34B, 34G and 34R correct the digital image data R, G and B according to sensitivity variations of the CCD line sensors and characteristics of the light volume distributions of the optical systems, respectively. The image data G and B outputted from the shading correction circuit 34G and 34B are delayed by delay times equivalent to the four line distance and the eight line distance by the output delay circuit 35G and 35B, respectively. Then, the image data G and B delayed by the output delay circuit 35G and 35B and the image data R outputted from the shading correction circuit 34R (hereinafter, the image data in this condition is referred to as "pre-noise-removal data") are inputted to the noise removal circuit 37.

Thereafter, the noise removal circuit 37 executes noise removal (step 202). The processing for noise removal is described in detail. When the start button is pressed down as described above, the CPU 40 causes the result hold circuit 53 (see FIG. 4) provided in each of the red dust detection circuit 36R, the green dust detection circuit 36G, and the blue dust detection circuit 36B to output the noise start point (x, y) and the length (the number of pixels) L of the line noise. Thereby, the noise start point (x, y) and the length (the number of pixels) L of the line noise are outputted from each of the result hold circuits 53 to the noise removal circuit 37.

Figure 11:
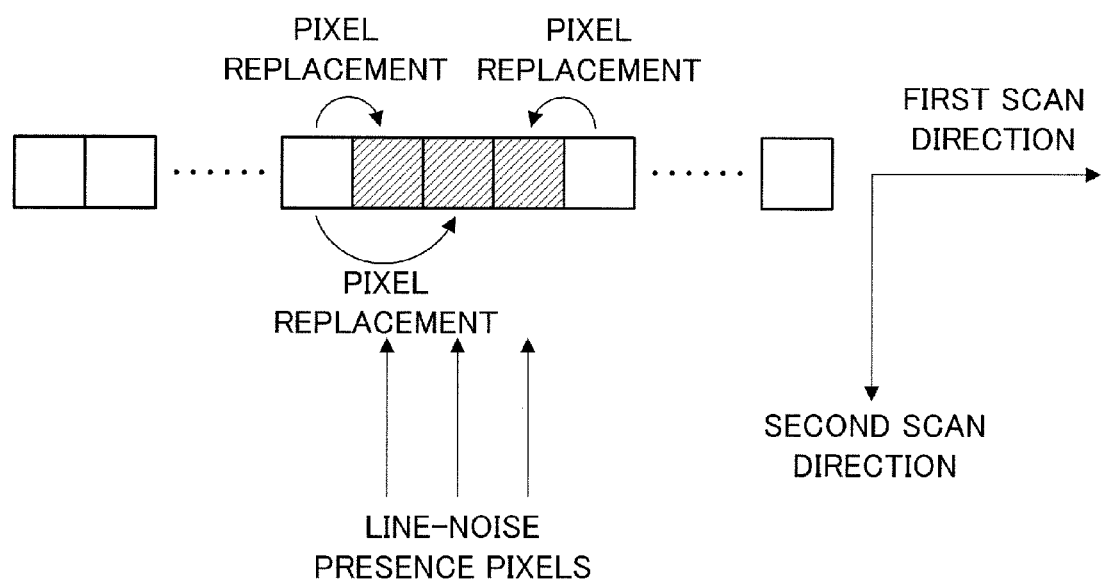
FIG. 11 is a diagram for explaining replacement processing by the noise removal circuit.

The noise removal circuit 37, which functions as a replacement unit and a correction unit, replaces, with other pixel data, a part of the pre-noise-removal data including pixel data of the pixel on the noise start point (x, y) of the noise and pixel data of the pixels located within the length L from the noise start point. This processing will be described in more detail by use of FIG. 11 (a diagram for explaining replacement processing by the noise removal circuit 37). The pixel data of each of the pixel on the noise start point (x, y) and the pixels located within the length L from the noise start point (line-noise presence pixels) is replaced with the pixel data of another pixel that is located adjacent to and on the right or left side of the pixel in the first scan direction (pixel replacement). With this replacement, the noise caused by the dust is removed from the image data of the manuscript M. In short, the image data of the manuscript M is corrected. Here, the image data after the noise removal is processed by the image processing circuit 38 (see FIG. 3) in any of various types of image processing such as color space conversion, scaling processing, ground color removal processing, and binarization processing, for example, and thereafter the resultant data is outputted to a personal computer (PC) or image forming apparatus, for example.

Here, instead of the processing shown in FIG. 9, the following processing may be preformed.

Figure 12:
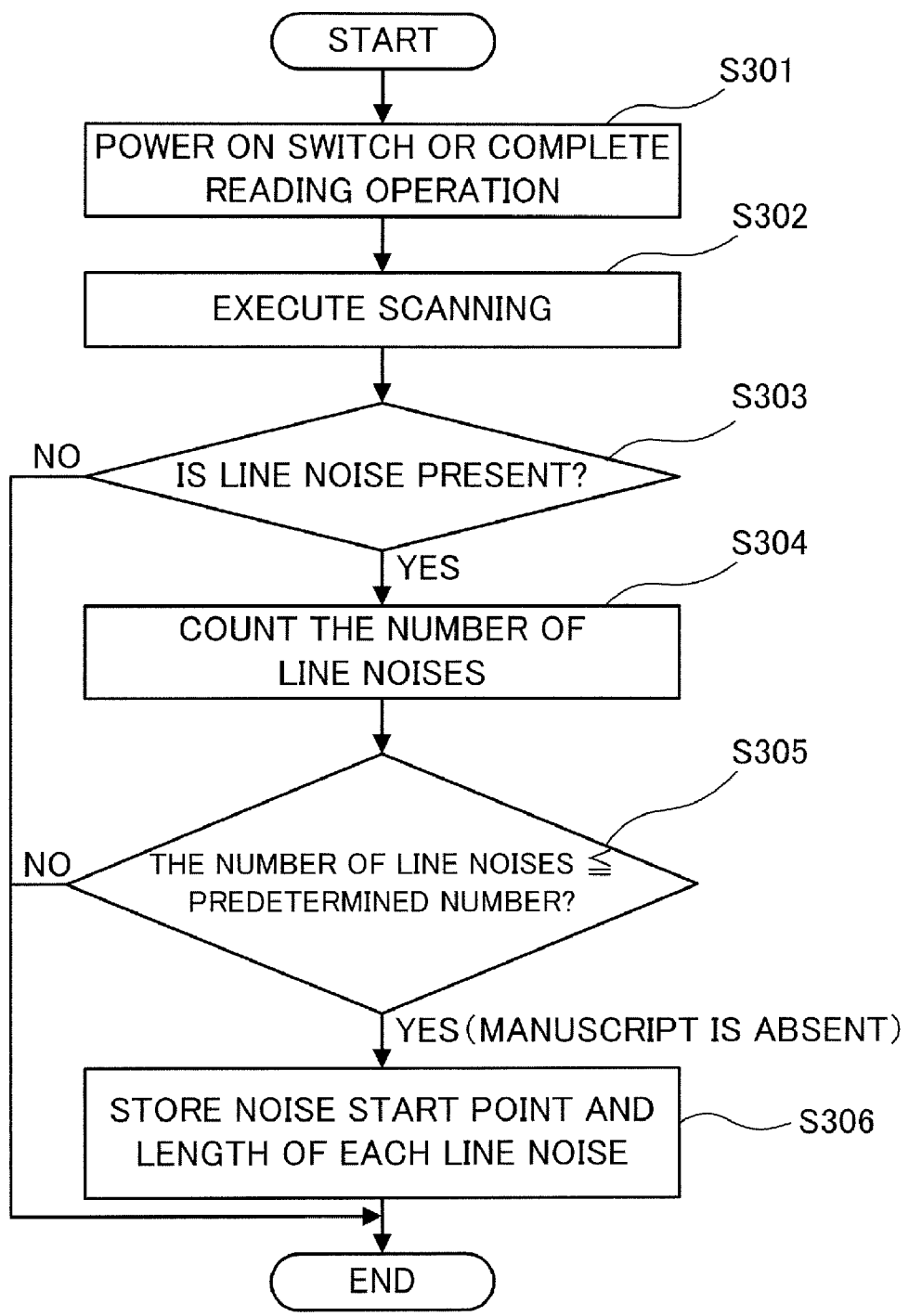
FIG. 12 is a flowchart showing one example of other processing executed by the image reading apparatus.

FIG. 12 is a flowchart showing one example of other processing executed by the image reading apparatus.

Firstly, when the power switch not shown in the figure is turned on, or when an ongoing operation of reading a manuscript M is completed (step 301), the CPU 40 drives the motors, which is not shown in the figure, to move the full rate carriage 13 and the half rate carriage 14, and thereby scanning is executed (step 302). As a result, the dust detection data outputted from the comparator circuit 52 is held by the result hold circuit 53, as described above. Then, the CPU 40 determines whether or not a line noise is present, on the basis of the dust detection data held by the result hold circuit 53 (step 303).

Subsequently, if the CPU 40 determines that a line noise is present, the CPU 40 counts the number of line noises (the number of pixel rows in each of which pixels determined as having dust successively exist) (step 304). Then, the CPU 40 determines whether or not the number of line noises is not more than a predetermined number (for example, five) (step 305). If it is determined that the number of line noises is not more than the predetermined number, the noise start point (x, y) and the length (the number of pixels) L of each of the line noises are stored in the result hold circuit 53 of the dust detection circuit 36 (step 306). Here, if it is determined that no line noise is present in step 303, the processing is terminated. Moreover, if it is determined that the number of line noises exceeds the predetermined number, the processing is also terminated.

The determination as to whether or not dust adheres to the second mirror 16B or the like (the acquisition of the positional information or the like of a line noise) needs to be performed on the basis of read data obtained with no manuscript M placed on the platen glass 12. In this regard, whether or not a manuscript is absent may be determined by using the sensor as described above, but may be determined on the basis of the number of line noises as described in the present exemplary embodiment. When the number of line noises exceeds the predetermined number, a manuscript is considered present. When the number of line noises is not more than the predetermined number, a manuscript is considered absent. In the present exemplary embodiment, when the number of line noises is not more than the predetermined number (when a manuscript is considered absent), the processing of storing the noise start point (x, y) and the length (the number of pixels) L is performed as described above.

Moreover, instead of the processing shown in FIG. 9, the following processing may be preformed.

Figure 13:
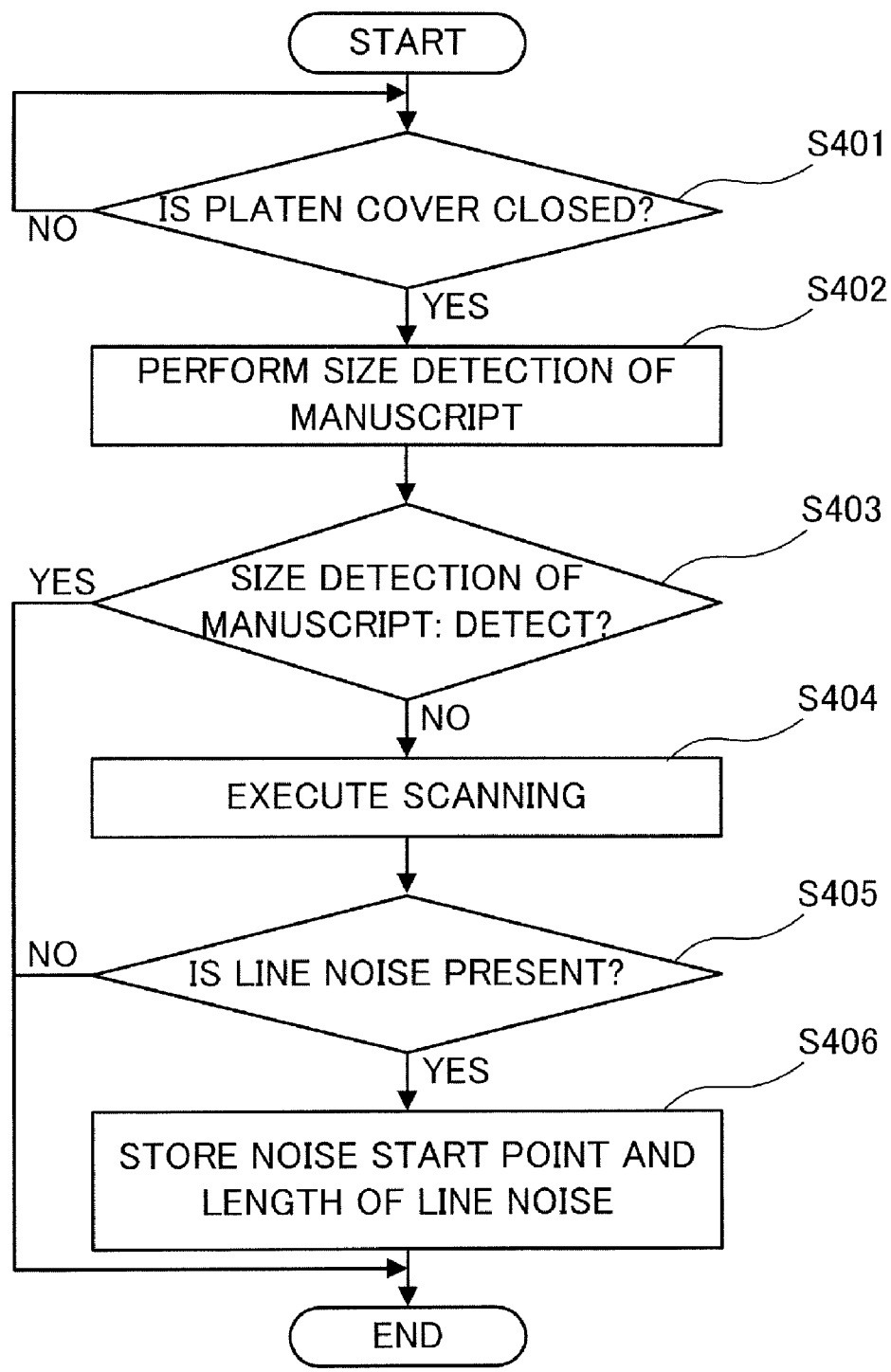
FIG. 13 is a flowchart showing one example of other processing executed by the image reading apparatus.

FIG. 13 is a flowchart showing one example of other processing executed by the image reading apparatus.

The CPU 40 first determines whether or not the platen cover 20 (see FIG. 1) is closed, on the basis of an output from a sensor not shown in the figure (step 401). If the CPU 40 determines that the platen cover 20 is closed, size detection of a manuscript M is performed (step 402). After that, the CPU 40 determines whether or not the size detection of the manuscript M is successfully performed (step 403). Here, if the size detection of the manuscript M fails, the manuscript M is considered absent on the platen glass 12.

Here, the size detection of the manuscript M may be performed on the basis of, for example, outputs from multiple sensors (as an example of a size detection unit) arranged below the platen glass 12 at certain intervals in the second scan direction and in the first scan direction. Alternatively, for example, image data may be firstly obtained by moving the full rate carriage 13 and the half rate carriage 14 (in other words, image data may be obtained by pre-scan), and then the size detection may be performed on the basis of the image data thus obtained. Otherwise, the size detection may be performed on the basis of both of the outputs from the multiple sensors and the reading result obtained by the pre-scan.

If the size detection of the manuscript is determined as a failure in step 403, the CPU 40 executes scanning (step 404), determines whether or not a line noise is present (step 405), and stores, if the line noise is present, the noise start point and the length L of this line noise in the result hold circuit 53 of the dust detection circuit 36 (step 406), in the same manner as in the foregoing processing of steps 103, 104 and 105.

In the aforementioned examples shown in FIGS. 9, 12 and 13, the scanning is executed when the predetermined processing is performed. Alternatively, the scanning may be executed at predetermined time intervals (of two hours, for example), and then the processing of acquiring the information on line noise may be performed.

In addition, in the foregoing description, a line noise is detected and removed by using RGB image data. However, the RGB image data may be converted into image data in another color specification system (for example, Lab image data), and then a line noise may be detected and removed on the basis of the image data after the conversion. Furthermore, although the foregoing description shows the processing in the case where an image is read by using the color CCDs (three line sensors), the same processing as described above is executable even in a case where an image is read by using black-and-white CCDs of a single line sensor.

In the foregoing description, a noise is removed from image data. Instead, in addition to the removal of the noise from the image date, a prompt to actually remove dust may be provided to a user by displaying a message indicating the adhesion of dust, or by outputting a sound of a message indicating the adhesion of dust. Furthermore, the present exemplary embodiment provides the description on the image reading apparatus not provided with a manuscript feeder, but, the image reading apparatus may be configured to include a reading part equipped with a manuscript feeder for transporting manuscripts.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a manuscript table on which a manuscript is placed;
a reflection mirror that moves relative to the manuscript table, and that reflects light which is emitted to and then reflected by the manuscript placed on the manuscript table;
an image data generating unit that includes a plurality of light receiving pixels receiving the light reflected by the reflection mirror, and that generates image data on the basis of the light received by the plurality of light receiving pixels; and
a positional information acquiring unit that acquires the image data generated by the image data generating unit with movement of the reflection mirror, and that acquires, on the basis of a density value of each pixel in the image data, information on a position of a pixel affected by an adhesion substance adhering to the reflection mirror,
wherein the positional information acquiring unit determines a pixel having a density value exceeding a threshold value set in advance, as the pixel affected by the adhesion substance, and
wherein
the positional information acquiring unit identifies the number of pixel rows in each of which pixels each having a density value exceeding the threshold value are successively located, and
the positional information acquiring unit determines that the pixels included in each of the pixel rows are pixels affected by the adhesion substance, if the number of the pixel rows is less than a predetermined number, and does not determine that the pixels included in each of the pixel rows are pixels affected by the adhesion substance, if the number of the pixel rows is more than the predetermined number.

2. The image reading apparatus according to claim 1, wherein the positional information acquiring unit acquires the information on the position of the pixel affected by the adhesion substance, on the basis of a density value of each pixel in the image data that is generated with the movement of the reflection mirror while the manuscript is not placed on the manuscript table.

3. The image reading apparatus according to claim 1, further comprising a replacement unit that makes replacement in other image data generated by the image data generating unit, in such a way that data of a pixel corresponding to the position indicated by the information acquired by the positional information acquiring unit is replaced with data of another pixel.

4. An image reading apparatus comprising:

a manuscript table on which a manuscript is placed;

a reflection mirror that moves relative to the manuscript table, and that reflects light which is emitted to and then reflected by the manuscript placed on the manuscript table;

an image data generating unit that includes a plurality of light receiving pixels receiving the light reflected by the reflection mirror, and that generates image data on the basis of the light received by the plurality of light receiving pixels;

a positional information acquiring unit that acquires the image data generated by the image data generating unit with movement of the reflection mirror, and that acquires, on the basis of a density value of each pixel in the image data, information on a position of a pixel affected by an adhesion substance adhering to the reflection mirror; and a size detection unit that detects a size of the manuscript placed on the manuscript table, wherein when the size detection unit does not detect the size, the positional information acquiring unit causes the reflection mirror to move while acquiring the image data generated by the image data generating unit, and acquires the information on the position of the pixel affected by the adhesion substance on the basis of the image data thus acquired.

* * * * *